United States Patent
Koreki et al.

(10) Patent No.: US 7,259,781 B2
(45) Date of Patent: Aug. 21, 2007

(54) ELECTRONIC CAMERA WITH AN ALARM FUNCTION

(75) Inventors: Taku Koreki, Akishima (JP); Noboru Yumoto, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/449,802

(22) Filed: May 29, 2003

(65) Prior Publication Data

US 2003/0222988 A1 Dec. 4, 2003

(30) Foreign Application Priority Data

Jun. 4, 2002 (JP) ............................. 2002-163052
Mar. 31, 2003 (JP) ............................. 2003-097032

(51) Int. Cl.
H04N 5/225 (2006.01)
H04N 9/04 (2006.01)
H04N 1/00 (2006.01)

(52) U.S. Cl. ............................. 348/207.99; 455/575.1
(58) Field of Classification Search ........... 379/106.05, 379/106.09

See application file for complete search history.

(56) References Cited

U.S. PATENT DOCUMENTS

| | | | |
|---|---|---|---|
| 3,672,269 A * | 6/1972 | Tabankin ..................... | 396/427 |
| 5,101,230 A | 3/1992 | Shikaumi et al. | |
| 5,574,520 A | 11/1996 | Ishihara | |
| 6,775,361 B1 * | 8/2004 | Arai et al. ................ | 379/93.17 |
| 6,950,126 B1 * | 9/2005 | Homma et al. ........ | 348/211.99 |
| 2001/0008421 A1 * | 7/2001 | Nishimura et al. ......... | 348/232 |
| 2002/0147033 A1 * | 10/2002 | Ban et al. .................... | 455/566 |

FOREIGN PATENT DOCUMENTS

EP       0 930 770 A2      7/1999
EP       0954150 A2 *     11/1999

(Continued)

OTHER PUBLICATIONS

Official Action (Notification of Reasons For Refusal) mailed Jul. 8, 2005 by the Japanese Patent Office and English translation thereof.

(Continued)

*Primary Examiner*—Lin Ye
*Assistant Examiner*—Yogesh Aggarwal
(74) *Attorney, Agent, or Firm*—Frishauf, Holtz, Goodman & Chick, P.C

(57) ABSTRACT

A digital camera comprising an optical lens system (12) that picks up an image of an object, a CCD (13), a sample and hold circuit (16), an A/D converter (17), a color process circuit (18), a timer (32) that records the present time or counts down a set time, a key-in unit (27) that sets an alarm time, a display (26) comprising a plurality of information means capable of selecting information with or without sound, a vibrator (30), an LED display (33), a speaker (35), and a controller (22) that selects at least one from the plurality of information means depending upon the pickup of an image being carried out when the timing operation by the timer (32) has ended, and causes the selected information means to inform the user that the set time has come or run out.

21 Claims, 8 Drawing Sheets

FOREIGN PATENT DOCUMENTS

| | | |
|---|---|---|
| EP | 0 961 478 A2 | 12/1999 |
| EP | 1 152 589 A2 | 11/2001 |
| EP | 1 168 810 A2 | 1/2002 |
| GB | 2366696 A * | 3/2002 |
| JP | 5-244081 | 9/1993 |
| JP | 11-317793 | 11/1999 |
| JP | 2000-217015 | 8/2000 |
| JP | 2000217015 A * | 8/2000 |
| JP | 2001-016560 | 1/2001 |
| KR | 20-1997-000323 | 10/1998 |

OTHER PUBLICATIONS

Office Action mailed Jul. 28, 2005 by the Korean Patent Office and English translation thereof.

Patent Abstracts of Japan vol. 018, No. 342 (E-1570), Jun. 28, 1994 and JP 06 086203 A (Canon Inc.), Mar. 25, 1994 *Abstract*.

* cited by examiner

ELECTRONIC CAMERA WITH AN ALARM FUNCTION

BACKGROUND OF THE INVENTION

1. Field of the Invention

The present invention relates generally to electronic cameras, and more particularly to electronic cameras including digital cameras having information functions such as, for example, a timer alarm, and a voltage drop alarm, etc., and also including cellular phones with a built-in camera having an incoming-call information function, and information controlling methods for the electronic cameras.

2. Description of the Related Art Information

Recently, digital still cameras that convert an image signal obtained by picking up an image to digital data and record the data in a built-in memory or on a memory card have generally been put widely to practical use in place of conventional cameras using a silver salt film.

In addition to the digital still cameras as a simple device, many companies have sold cellular phones each of which records image data obtained by a camera function thereof in a built-in memory or on a memory card, displays the recorded image data on a monitor of the cellular phone, and sends another terminal the image data as a file attached to an electronic mail.

These cellular phones have an incoming-call information function that informs the user of an arrival of an incoming call signal by alarm sound or vibrations of a vibrator as a basic function, as well as an alarm information function that informs the user that a preset time has come or run out, by alarm sound or vibration of the vibrator.

SUMMARY OF THE INVENTION

According to one aspect of the present invention, there is provided an electronic camera comprising a pickup control unit for causing an image pickup unit to pick up an image, an information control unit for causing an information unit to perform an information operation, and an inhibiting unit for inhibiting the information control unit from causing the information unit to perform the information operation when the pickup control unit is causing the pickup unit to pick up the image.

According to another aspect of the present invention, there is also provided an information control method in an electronic camera, comprising the steps of causing a pickup unit to pick up an image, causing an information unit to perform an information operation, and inhibiting the information unit from performing the information operation when the pickup unit is picking up the image.

DESCRIPTION OF THE PREFERRED EMBODIMENTS

First Embodiment

A first embodiment of the present invention directed to a digital still camera (hereinafter referred to as "digital camera") will be described with reference to the accompanying drawings.

Figure 1:
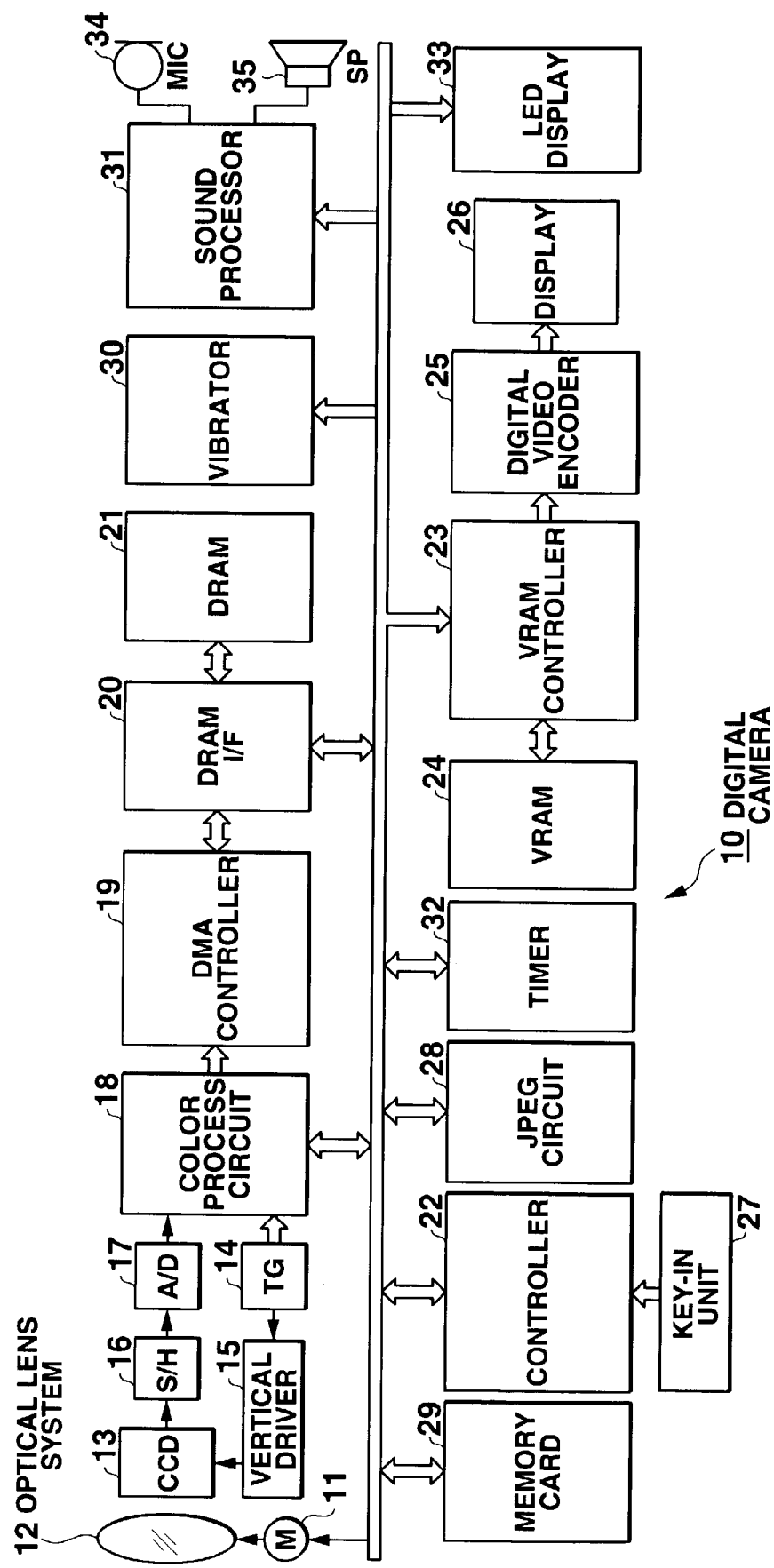
FIG. 1 is a block diagram of a whole circuit composition of a digital camera according to a first embodiment of the present invention.

FIG. 1 shows a circuit composition of the digital camera, generally designated by reference numeral 10. The digital camera 10 is capable of selectively setting one of a record (image pickup) mode and a replay mode as basic modes. When a monitoring state is set in the record mode, a CCD 13, which includes an image pickup element disposed on an optical pickup axis after an optical lens system 12 whose focusing or strip position is moved by a motor 11, is scanned by a timing generator (TG) 14 and a vertical driver 15 and outputs a photoelectric conversion output for a single image corresponding to a focused optical image at predetermined periods of time.

The photoelectric conversion output is appropriately gain adjusted for each of R, G and B primary color components in a state of an analog signal, sampled and held by a sample and hold circuit (S/H) 16, and converted by an A/D converter 17 to digital data. Such digital data are then subjected to a color process including pixel interpolation, γ-correction and brightness/color difference data conversion in a color process circuit 18 to thereby produce a digital brightness signal Y and color difference signals Cb and Cr, which are then outputted to a DMA (Direct Memory Access) controller 19.

The DMA controller 19 temporarily writes the brightness signal Y and the color difference signals Cb, Cr outputted from the color process circuit 18 to an internal buffer of the DMA controller 19, using a composite sync signal, a memory write enable signal and a clock signal from the color process circuit 18, and then DMA transfers the written signals via a DRAM interface (I/F) 20 to a DRAM 21 as a buffer memory.

After DMA transferring the brightness signal and the color difference signals to DRAM 21, the controller 22 reads out the brightness signal and the color difference signals via the DRAM interface 20 from DRAM 21 and then writes these signals to VRAM 24 via the VRAM controller 23.

A digital video encoder 25 periodically reads out the brightness signal and the color difference signals via the VRAM controller 23 from VRAM 24, generates a video signal based upon these data, and then outputs the video signal to a display 26.

The display 26 is composed of a color liquid crystal display panel, for example, with a backlight and its driver circuit and disposed on a back of the digital camera 10. The display 26 functions as a monitor display (electronic finder)

in the record mode, and displays an image based upon image information received from the VRAM controller 23 via the digital video encoder 25.

When a shutter button (not shown) included in a plurality of keys that composes a key-in unit 27 is depressed for pickup of a still image in a state in which the image is displayed real-time as a monitored image on the display 26, a corresponding trigger signal is generated.

The controller 22 exposes the CCD 13 to light and scans it in accordance with the trigger signal in order to obtain a still image for record and storage, DMA transfers the obtained brightness signal and color difference signals for one image to DRAM 21, and then shifts its control to a record/storage step.

In this record/storage step, the controller 22 reads out the brightness signal and the color difference signals for one frame written in the DRAM 21 in units of a so-called basic block of 8 (vertical)×8 (horizontal) pixels for each of the Y, Cb and Cr components via the DRAM interface 20, writes the read signals to a JPEG (Joint Photograph Coding Experts Group) circuit 28, which performs ADCT (Adaptive Discrete Cosine Transform) on the signals, and then compresses resulting data in a Huffman encoding process of an entropy encoding system.

The controller 22 then reads out the processed code data from the JPEG circuit 28, and writes them as a still image data file for JPEG to a memory card 29 including a flash memory that is a non-volatile memory removably set as a recording medium for the digital camera 10.

When compression of the brightness signal and the color difference signals for one frame and writing all the compressed data to the memory card 29 has ended, the controller 22 returns the operation of the image pickup system (CCD 13-display 26) to an image pickup process for obtaining an image for display on the finder.

The controller 22 is connected to a vibrator 30, a sound processor 31, a timer 32 and an LED 33.

The vibrator 30 gives a time warning in vibrations in accordance with a result of time counting by the timer 32.

The sound processor 31 includes a sound source circuit, for example, for a PCM sound source. In sound recording, the sound processor 31 digitizes a sound signal received from a microphone (MIC) 34 in the sound recording, compresses the resulting digital data to create a sound data file, and then delivers this file to the controller 22. The sound processor 31 also expands the sound data file received in the sound replay into an analog signal, which drives a speaker (SP) 35 to thereby to amplify and produce the recorded sound, an alarm beep, a voice message, etc.

The timer 32 has a RTC (Real Time Clock) function that records the present time under a power supply control other than the controller 22. When the time set by the controller 22 has come or run out, the timer sends a time-end signal to the controller 22.

The LED display 33 includes a self-timer LED lamp provided on a front of a housing of the digital camera 10, and LED lamps for indicating a focused state and a strobe charged state provided within an optical finder on the back of the housing to thereby provide respective indicator displays. The LED display 33 gives a warning in a blinking display in accordance with a result of time counting by the timer 32.

In addition to the shutter button, the key-in unit 27 includes a record/replay mode switching key that switches between a record (REC) mode (image pickup mode) and a replay (PLAY) mode as basic modes, a record mode switching key that selects in the record mode one of a "still-image-with-sound pickup mode", a "soundless still-image pickup mode", a "moving-image-with-sound pickup mode", a "soundless moving-image pickup mode", and a "speech memorandum record mode (only a voice)", a "menu" key that displays various menu items, a cross key that indicates the respective up, down, right and left directions to select respective images and modes and specify a selected menu item, a "set" key disposed at the center of the cross key to indicate what is selected at that time, and a display key that turns on/off a display on the display 26. Signals produced by depressing these respective keys are directly sent to the controller 22.

When the shutter button of the key-in unit 27 is depressed in the still-image-with-sound pickup, the pickup of the still image starts and simultaneously the microphone 34 starts to record a sound, as described above. The recording operation is terminated when a predetermined record time (for example, of 15 seconds) has elapsed. The sound data obtained by this recording is recorded as a sound data file on a memory card 29. The timings of starting and terminating the sound recording may be commanded at the key-in unit 27 arbitrarily by the user.

When in the pickup of a moving image other than the still image, still image data obtained repeatedly by the CCD 13 while the shutter button of the key-in unit 27 continues to be depressed is stored in the DRAM 2. When the depression of the shutter button ends (or a predetermined moving image pickup time has elapsed), a plurality of still image data stored in the DRAM 21 are sequentially compressed by the JPEG circuit 28 and recorded as a moving image data file of motion JPEG on the memory card 29.

While the shutter button of the key-in unit 27 continues to be depressed in the pickup of the moving image with sound, storage of the still image data acquired repeatedly by the CCD 13 in the DRAM 21 and storage of the sound data input from the microphone 34 in the internal memory of the sound processor 31 are performed in parallel. When the depression of the shutter button ends (or a predetermined moving image enable pickup time has elapsed), the plurality of still image data stored in the DRAM 21 are sequentially compressed by the JPEG circuit 28 and recorded as a moving image data file of motion JPEG on the memory card 29. Simultaneously, when the depression of the shutter button ends (or when the predetermined moving image enable pickup time has elapsed), the sound data stored in the internal memory of the sound processor 31 is recorded as a sound data file on the memory card 29.

When there is a sound data file corresponding to an image data file, irrespective of whether the image data file is for the still image or the moving image, the sound data file may be recorded with the same title as the image data file on the memory card 29 to thereby replay the image and the sound simultaneously on demand.

Operation of the embodiment will be described next.

Figure 2:
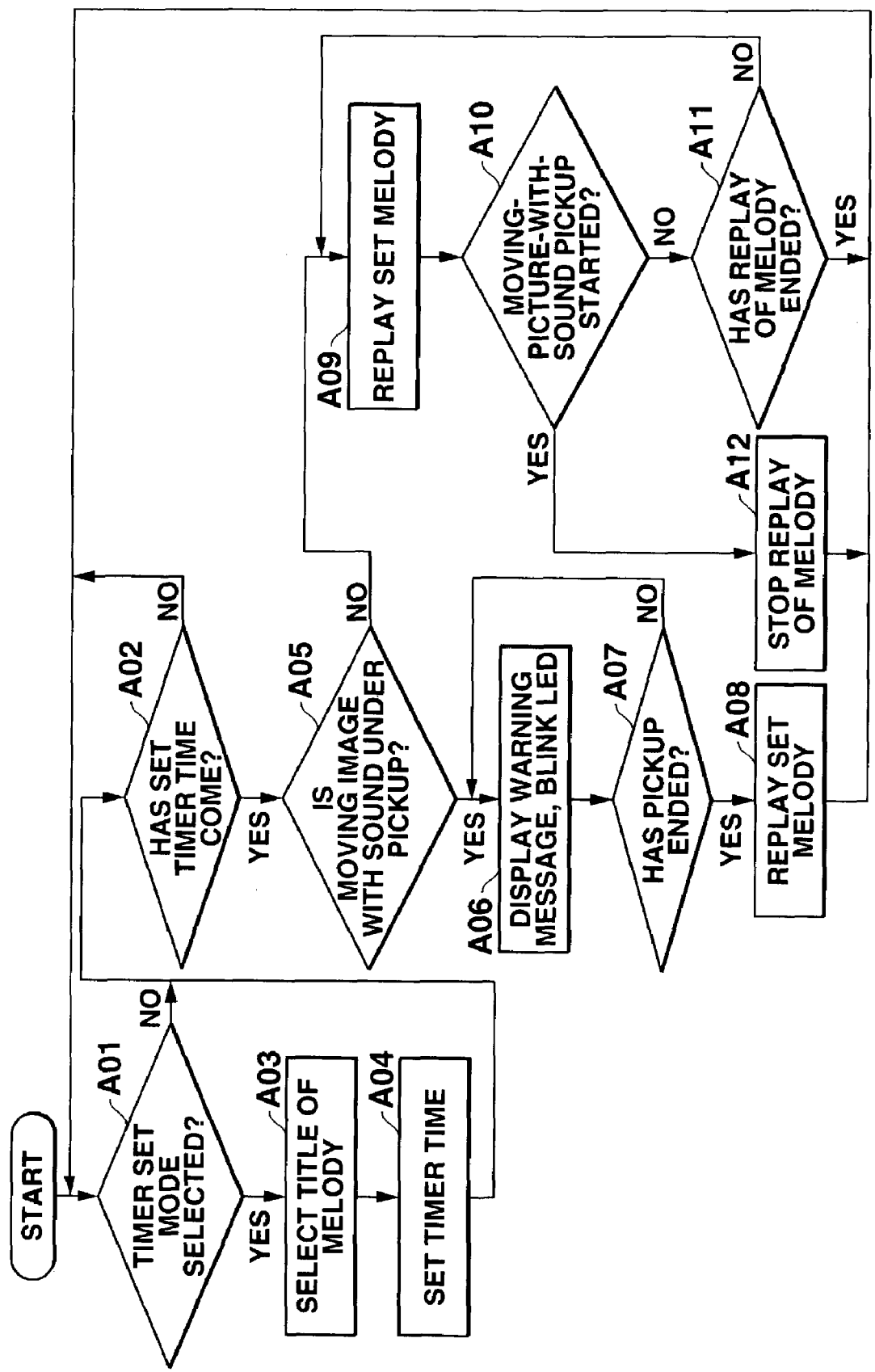
FIG. 2 is a flowchart indicative of an alarm information process based upon a timer function of a digital camera of the first embodiment.

FIG. 2 mainly illustrates a timer function-directed process to be performed by the controller 22 when the record mode is selected as a basic mode. First, the controller 22 repeatedly determines whether or not a timer function set mode has been selected (step A01), and then whether or not a time set in the timer 32 has actually run out or come (step A02) to thereby wait for arrival of such situation.

When the controller 22 determines at step A01 that the timer function set mode has been selected, a title of a melody that will be produced audibly when the set time has run out or come is selected (step A03).

This is carried out, for example, by displaying a prepared list of titles of melodies on the display 26 and by having the user of the digital camera 10 manipulate the cross key and the "set" key of the key-in unit 27 to select a desired one from among the list of titles.

Then, a time called "timer time" in the Figure when alarm information is given is set (step A04). To this end, one of "Alarm information should be given a predetermined time after the present time." and "Alarm information should be given at a set time." is selected, and then a corresponding specified numerical time value is set. After this, the process then returns to step A02.

Then, when the controller 22 determines at step A02 that the time has run out or come after or at which the start of the timer function has been set, it also determines whether or not the moving image with sound is under pickup (step A05).

If alarm information is given by playing tone data of a melody whose title is selected at step A03 and amplifying and audibly producing the tone data as a melody tone from the speaker 35 when the controller 22 determines that the moving image with sound is under pickup, the melody tone would mix with the sound being recorded by the microphone 34. Thus, in place of giving sound alarm information, a warning message that the set time has run out or come is displayed on the display 26 while simultaneously blinking the LED lamps of the LED display 33 provided on the back of the camera housing (step A06) to thereby wait for the pickup of the moving image with sound to be terminated (step A07).

When the controller 22 determines at step A07 that the pickup of the moving image with sound is terminated, the controller stops the display-only alarm information at step A06, replays the tone data on the melody selected at step A03, causes the speaker 35 to amplify and audibly produce resulting data as a sound to thereby give alarm information (step A08). Thus, the series of steps mentioned above are terminated and the process returns to step A01.

When the controller 22 determines at step A05 that no moving image with sound is under pickup when the time after or at which the start of the timer function is set has run out or come, it determines that there is no problem even when the set information is given. Thus, the controller gives alarm information by replaying the tone data of the melody selected at step A03 and causing the speaker to amplify and audibly produce the replayed tone data as a melody tone (step A09). During this time, the controller repeatedly determines whether or not the pickup of the moving image with sound has started (step A10) and whether replay of the selected melody has been terminated (step A11) to thereby wait for the timing of terminating the alarm information to come.

When the controller 22 then determines at step A11 that the replay of the melody selected has been terminated, it directly terminates the series of steps mentioned above and the process then returns to step A01.

When the controller 22 determines at step A10 that the pickup of the moving image with sound has started, it immediately stops outputting the replayed melody tone as alarm information because continuation of replay of the melody would cause the melody sound to mix with the sound involved in the image being pick up (step A12). Then, the controller determines that the series of steps have been terminated, and the process returns to step A01.

As described above, although sound alarm information is basically given in a selected melody, the sound alarm information is inhibited, especially when a moving image with sound is picked up.

Thus, the alarm information sound is prevented from mixing with a sound being recorded along with the moving image.

A tone of the melody as the set information means is amplified and audibly outputted when the pickup of the moving image with sound has been terminated. Thus, when the set time has run out or come, the user of the digital camera 10 can be anew notified more reliably of the fact.

While in the embodiment the basic alarm information means has been illustrated as selecting and outputting a melody tone, the present invention is not limited to this particular case. For example, the warning means may be selected from among various beeps and various sound effects using a PCM sound source. In addition to the sound, one or more can selected for alarm information from among various sounds, vibrations produced by the vibrator 30, various blinking patterns of the LED lamps of the LED display 33, and character strings of warning messages displayed on the display 26 and given individually or in combination as a warning.

When it is considered that operating information means which gives preset information the image pickup would adversely affect the image pickup, alarm information can be given by another means that will not adversely affect the pickup during the image pickup without giving alarm information when the pickup is terminated.

As described above, in the embodiment only when it is considered that operating a preset alarm information means during the image pickup will adversely affect the image pickup, another information means (method) that does not adversely affect the image pickup is selected to give alarm information. Arrangement may be such that another information means that does not adversely affect the image pickup gives information whenever the alarm time has come, irrespective of whether or not the image pickup is in operation, and only the informing operation of the information means that will adversely affect the image pickup is inhibited when the alarm time has come during the image pickup.

In addition, when a sound alarm information time has come during pickup of the soundless still/moving image, sound alarm information may be given as set without selecting another information means. When a vibration alarm information time has come during pickup of the soundless still/moving image, sound alarm information may be selected and given. Alternatively, even when the image pickup is not directly adversely affected, display alarm information may be given by daring to stop giving sound alarm information.

It may be determined whether or not the camera is in the pickup mode when the timing of giving alarm information has come, irrespective of whether or not the camera is actually in the image pickup. When it is determined that the camera is in the image pickup mode, giving the alarm information may be inhibited to prevent the image pickup from being adversely affected.

It is determined in the particular embodiment whether or not the camera is in the image pickup when the timing of giving the alarm information has come and that if so, an information output that will adversely affect the image pickup is inhibited and another information method is used. In contrast, an operation mode to inhibit giving information (by changing the information method) may be set when the image pickup starts and cancelled when the image pickup is terminated. Alternatively, the information device selected may be replaced with another when the image pickup starts and the information device used before the replacement may be used again.

Second Embodiment

A second embodiment of the present invention directed to a digital still camera (hereinafter referred to as "digital camera") will be described with reference with the accompanying drawings.

The digital camera of this embodiment is basically the same in composition as the digital camera of the first embodiment of FIG. 1. Thus, a component of this embodiment identical to that of the embodiment of FIG. 1 is identified by the same reference numeral as used to denote that element of FIG. 1 and further FIGUREs and description thereof will be omitted.

Operation of the second embodiment will be described next.

Figure 3:
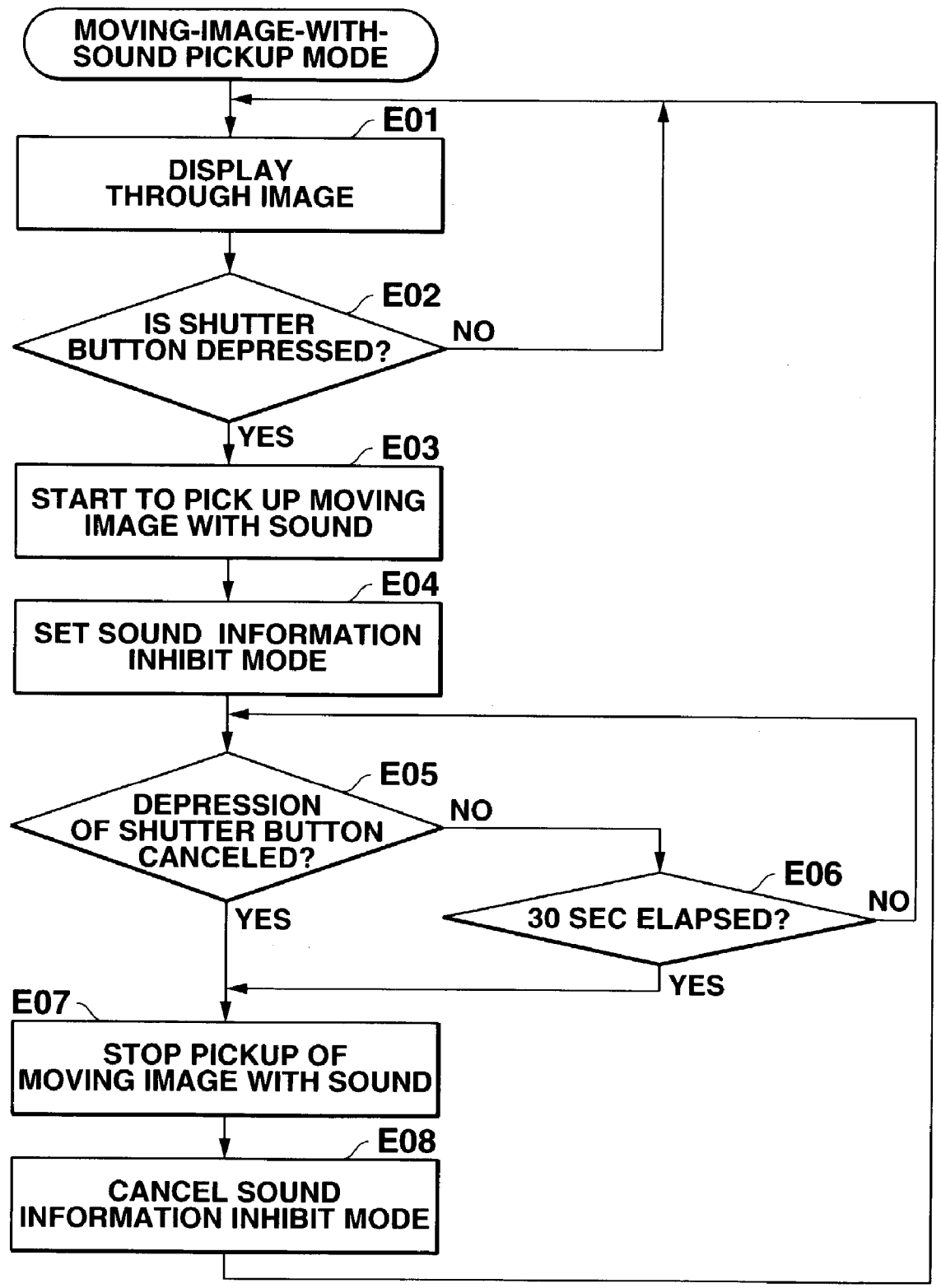
FIG. 3 is a flowchart indicative of an alarm information process based upon a timer function of a digital camera of a second embodiment.

FIG. 3 illustrates a process to be performed in a moving-image-with-sound pickup mode, giving information in sound and display outputs, using a timer function, when the alarm information time has come.

First, the controller 22 saves intact the image picked up by the CCD 13 in DRAM 21 as a buffer memory. The display 26 displays a through image for monitoring purposes (step E01). Then, the controller repeatedly sees whether or not the image pickup has been started by depressing the shutter button of the key-in unit 27 (step E02).

When the controller 22 determines in step E02 that the shutter button of the key-in unit 27 has been depressed and that the pickup of the moving image with sound has started, it starts the pickup of the moving image and sound recording to create a data file of motion JPEG and a sound data file (step E03), and sets a mode to inhibit giving a warning using a sound output (step E04).

Then, the controller 22 repeatedly sees whether or not the depression of the shutter button has been cancelled and the image pickup has been terminated (step E05) and whether or not 30 seconds have elapsed since the start of the moving image pickup (step E06) to thereby wait for such situation to come.

When a result of the determination at step E05 or E06 is YES, the controller 22 stops the moving image pickup and the sound recording, and creates a moving image data file and a sound data file and records them on a memory card 29 (step E07). Then, the controller cancels the mode to inhibit giving information, using a sound output. Control then returns to step E01 (step E08).

As described above, when the alarm time has come when the moving image with sound is not under pickup, the information is given in sound and display outputs. When the alarm information time has come in the moving-image-with-sound pickup operation, information is given in a display output only.

Third Embodiment

A third embodiment of the present invention directed to a digital still camera (hereinafter referred to as "digital camera") will be described with reference with the accompanying drawings.

The digital camera of this embodiment is basically the same in composition as the digital camera of the first embodiment of FIG. 1. Thus, a component of this embodiment identical to that of the embodiment of FIG. 1 is identified by the same reference numeral as used to denote that element of FIG. 1 and further FIGUREs and description thereof will be omitted.

Operation of the third embodiment will be described next.

Figure 4:
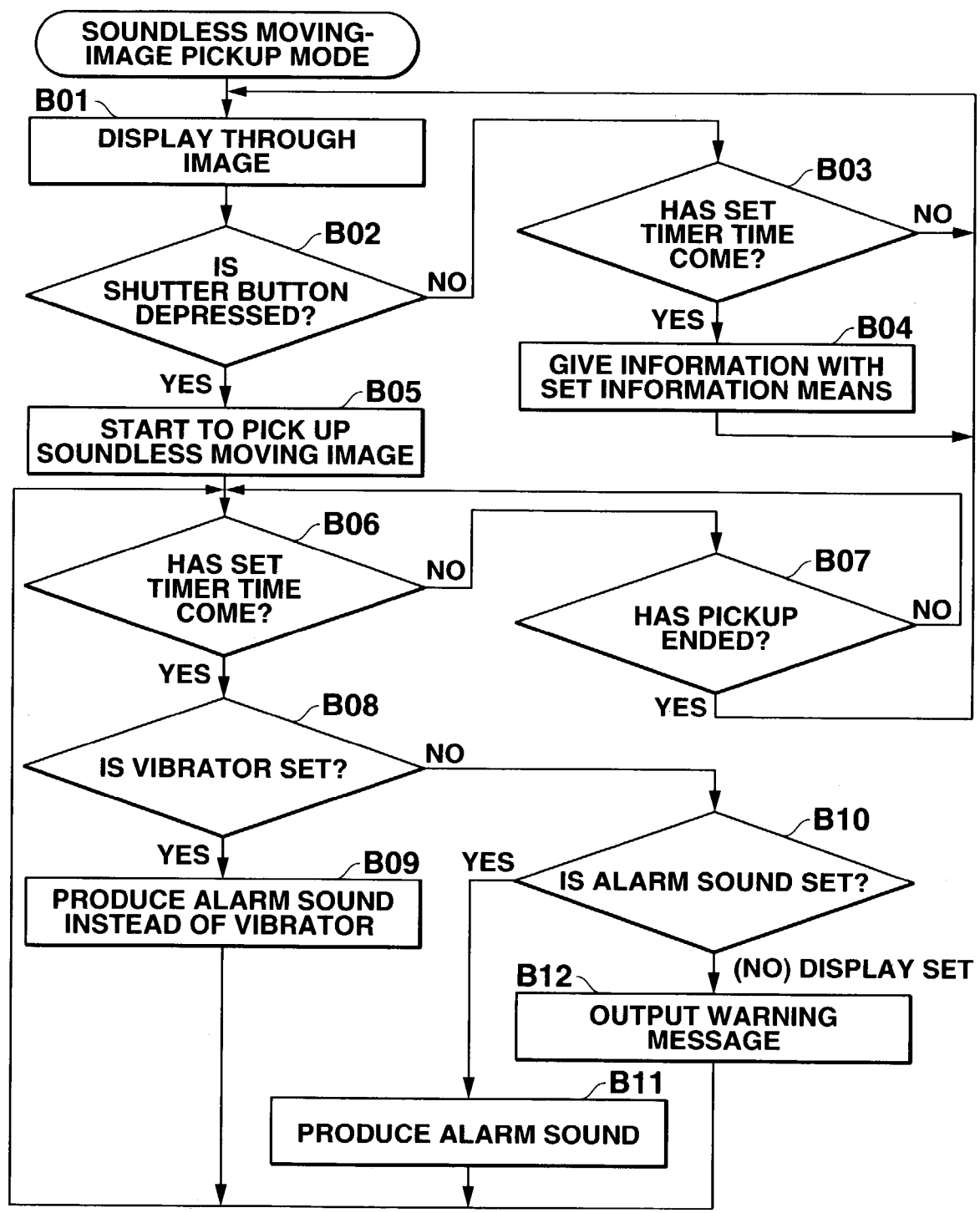
FIG. 4 is a flowchart indicative of an alarm information process based upon a timer function of a digital camera of a third embodiment.

FIG. 4 illustrates a process to be performed in a soundless moving-image pickup mode in which the user can select and set from among sound, vibration and display alarm information method, using the timer function of the timer 32.

First, the controller 22 saves intact the image picked up by the CCD 13 in DRAM 21 as a buffer memory. The display 26 displays a through image for monitoring purposes (step B01). Then, the controller repeatedly sees whether or not the image pickup has been started by depressing the shutter button of the key-in unit 27 (step B02) and whether or not the time set in the timer 32 has run out or come (step B03) to thereby wait for such situation to come.

When the controller 22 determines at step B03 that the time set in the timer 32 has run out or come, the pickup of the soundless moving image has not yet started. Therefore, alarm information is given based upon the information means set arbitrarily and beforehand (step B04) and then control returns to step B01.

When the controller 22 determines that the shutter button of the key-in unit 27 has been depressed and that the start of pickup of the soundless moving image has been commanded, the pickup of the soundless moving image starts to create a data file of the motion JPEG (step B05). Then, the controller repeatedly determines whether or not the time set in the timer 32 has run out or come (step B06) or whether or not the depression of the shutter button has been cancelled and the pickup of the soundless moving image has been terminated (step B07) to thereby wait for such situation to come.

When the controller 22 determines at step B07 that the depression of the shutter button has been cancelled and the pickup of the soundless moving image has been terminated, it sets a data file of motion JPEG to be recorded on the memory card 29, as described above, and returns the alarm information process based upon the timer function of FIG. 4 to step B01.

When the controller 22 determines at step B06 that the time set in the timer 32 has run out or come during the pickup of the soundless moving image, it determines whether the information means set arbitrarily uses vibrations produced by the vibrator 30 (step B08).

When the controller 22 determines that the information means has been set so as to give alarm information in vibrations produced by the vibrator 30, the controller 22 should then give alarm information by amplifying and producing a preset alarm sound, for example, with the aid of the speaker 35 in place of the vibrator 30 (step B09). This is because if the vibrator 30 directly produces vibrations, the image being picked up would be disturbed, irrespective of whether or not the digital camera 10 is held by the user's hands or fixed on a tripod. Control then returns to step B06.

When the controller 22 determines at step B08 that the information means has not been set so as to give an alarm of vibrations produced by the vibrator 30, it then determines whether or not the alarm has been set so as to give an alarm sound (step B10).

When the controller 22 determines that the information means has been set so as to give alarm information in sound, the alarm sound is amplified and then produced by the speaker 35 (step B11). Then, control returns to step B06.

When the controller 22 determines at step B10 that the alarm information means has not been set so as to give sound alarm information, the controller knows that the information means has been set so as to give display alarm information to thereby give the set alarm information in displayed message on the display 26 (step B12). Control then returns to step B06.

During the pickup of the moving image, the user of the digital camera 10 might be astonished by an alarm sound emitted during the pickup of the moving image to thereby shake temporarily the camera held by the user. Thus, even in the processing at step B09 or B11, display alarm information may be given without daring to use sound alarm information.

While it was illustrated in the embodiment that the use of alarm information using vibrations produced by the vibrator 30 should be avoided in the moving image pickup, this also applies in the still image pickup.

When the controller 22 determines the type of the information means set when the timing of giving alarm information has come in each of various image pickup modes or in the actual image pickup and also determines that the information means may possibly affect the image pickup adversely in the present set pickup mode, another information means may be used instead or otherwise giving alarm information may be delayed until the pickup mode is cancelled to thereby prevent the information from adversely affect the image pickup.

While in the embodiment the information method is changed when the timing of giving alarm information has come during the image pickup, giving the alarm information may be delayed until the pickup is terminated when the timing of giving the alarm information has come during the image pickup.

While it is illustrated that in the embodiment the controller determines the type of the information method set when the timing of giving the alarm information has come during the image pickup and then determines whether or not another information method should be used in accordance with a result of the determination to thereby give information, the controller may determine the type of the information method set when the image pickup has started and then whether or not the information method set at that time should be changed to a different one in accordance with a result of the determination. When the different information method is set, the information method used before the pickup started when the pickup has been terminated may be again used.

Fourth Embodiment

A fourth embodiment of the present invention directed to a digital still camera (hereinafter referred to as "digital camera") will be described with reference with the accompanying drawings.

The digital camera of this embodiment is basically the same in composition as the digital camera of the first embodiment of FIG. 1. Thus, a component of this embodiment identical to that of the embodiment of FIG. 1 is identified by the same reference numeral as used to denote that element of FIG. 1 and further FIGUREs and description thereof will be omitted.

In this embodiment, the shutter button of the key-in unit 27 is operated in two stages of operation, wherein image pickup including AF (Automatic Focusing) and AE (Automatic Exposure) operations is prepared in a first stage of operation generally referred to as "half depression" and an image is picked up in a second stage of operation referred generally as "full depression".

Operation of this embodiment will be described next.

Figure 5:
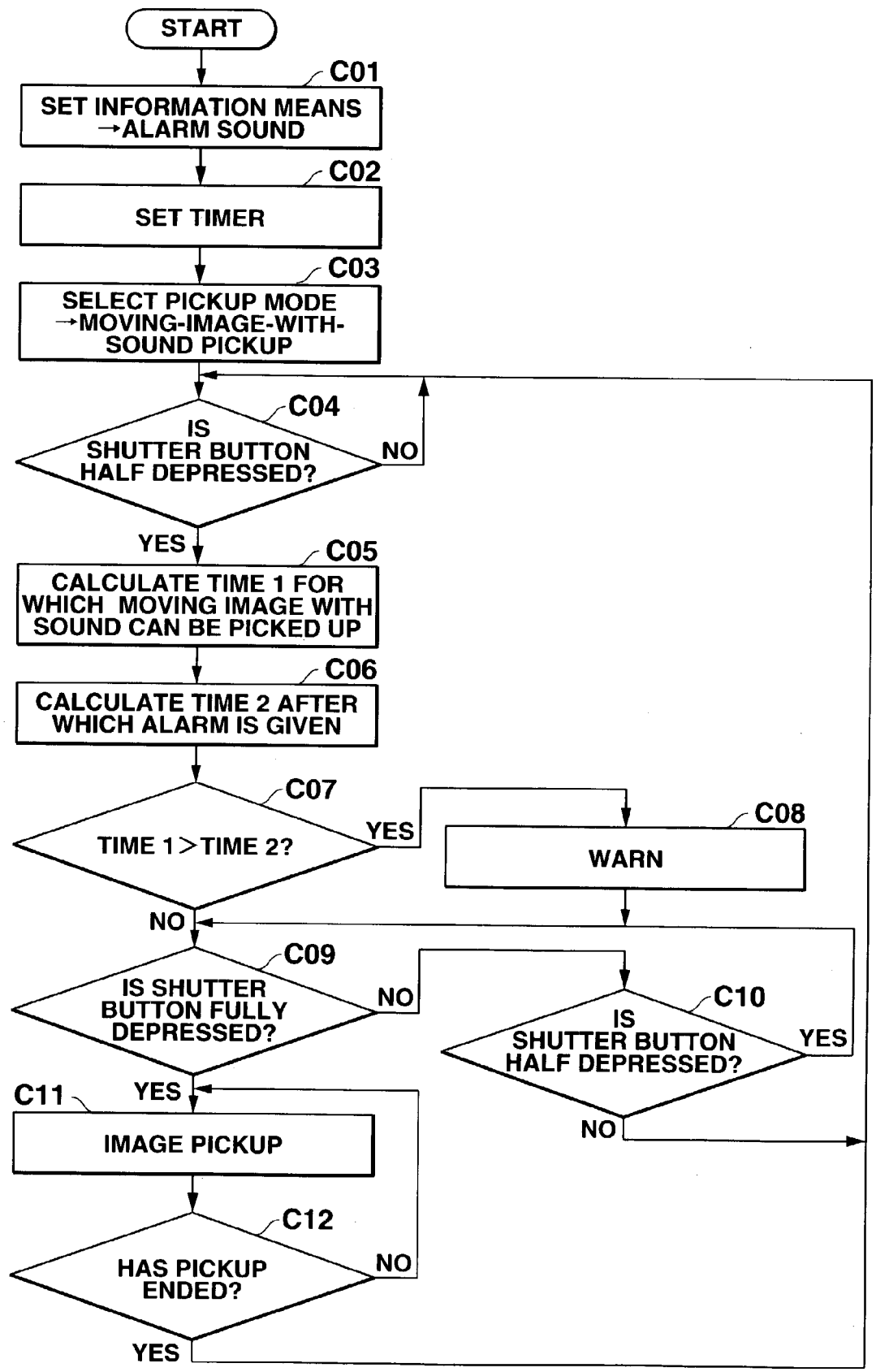
FIG. 5 is a flowchart indicative of an alarm information process based upon a timer function of a digital camera of a fourth embodiment.

FIG. 5 shows the contents of a series of processes for alarm information which will be performed based upon a timer function when a moving image with sound is picked up after an alarm sound is selected and set as information means.

First, the type of an alarm sound to be produced from the speaker 35 as alarm means is selected and set (step C01). In addition, a time that runs out after the alarm information is actually given or a time at which the alarm information is given is set by the timer 32 (C02).

In addition, when a moving-image-with-sound pickup mode is selected and set as a pickup mode (step C03), which means completion of preparation for picking up the moving image with sound. Then, the controller 22 waits for the shutter button of the key-in unit 27 to be half depressed (step C04).

When the controller 22 determines at step C03 that the shutter button has been half depressed, the controller calculates a continuous time Time 1 for which the moving image with sound can be picked up (step C05).

When the memory card 29 has a sufficient space capacity, the continuous time Time 1 is a preset value peculiar to the type of the digital camera 10 (or a value that the user has beforehand set arbitrarily). When the memory card 29 has no sufficient space capacity, the continuous time Time 1 is a quotient obtained by dividing the present space capacity by a presumed capacity of the moving-image-with-sound file to be used in a unit time.

A time Time 2 after or at which the alarm information set at step C02 is given is calculated by the timer 32 (step C06). When Time 2 is the time after which the alarm information is given, it represents the time being counted down. When Time 2 at which the alarm information is given is set, it represents the set time minus the present time.

After Times 1 and 2 are calculated, the controller 22 determines whether or not Time 1 is greater than Time 2, or whether or not there is a possibility that alarm information will be given during the pickup of the moving image with sound if the pickup of this image starts immediately from the time when that determination is made (step C07).

It may be arranged that when the time at which the alarm is given is set, at steps C05-C07 the time when the end of the image pickup is presumed is calculated from the present time and the continuous time Time 1 for which the moving image with sound can be picked up, and that the time when the end of the image pickup is presumed is compared to the set timer time to thereby determine whether or not there is a possibility that the alarm information will be given during the image pickup.

Only when the controller 22 determines that Time 1 is greater than Time 2, there is a possibility of giving alarm information during the image pickup. Therefore, the user is warned of this possibility in a character message displayed on the display 26 (step C08).

Then, the controller 22 repeatedly determines whether or not the shutter button has been fully depressed (step C09) and whether or not the shutter button is still half depressed (step C10) to thereby wait for the pickup to start while maintaining preparations for the pickup.

When the controller 22 determines at step C10 that the shutter button is not half depressed, it temporarily cancels the preparations for the image pickup, and control returns to step C04.

When the controller 22 determines at step C9 that the shutter button has been fully depressed, the moving image starts to be picked up (step C11). During this time the controller 22 repeatedly determines whether or not the pickup of the moving image should be terminated depending upon any one of cancellation of the shutter button's depression, elapse of the preset longest continuous time for the moving image pickup and deficiency of the space capacity of the memory card 29 (step C12) to thereby wait for termination of the pickup. When the controller 22 determines at step C12 that the pickup has been terminated, control then returns to step C04 to prepare for a next pickup.

Fifth Embodiment

A fifth embodiment of the present invention directed to a digital still camera (hereinafter referred to as "digital camera") will be described with reference with the accompanying drawings.

The digital camera of this embodiment is basically the same in composition as the digital camera of the first embodiment of FIG. 1. Thus, a component of this embodiment identical to that of the embodiment of FIG. 1 is identified by the same reference numeral as used to denote that element of FIG. 1 and further FIGURE and description thereof will be omitted.

Figure 6:
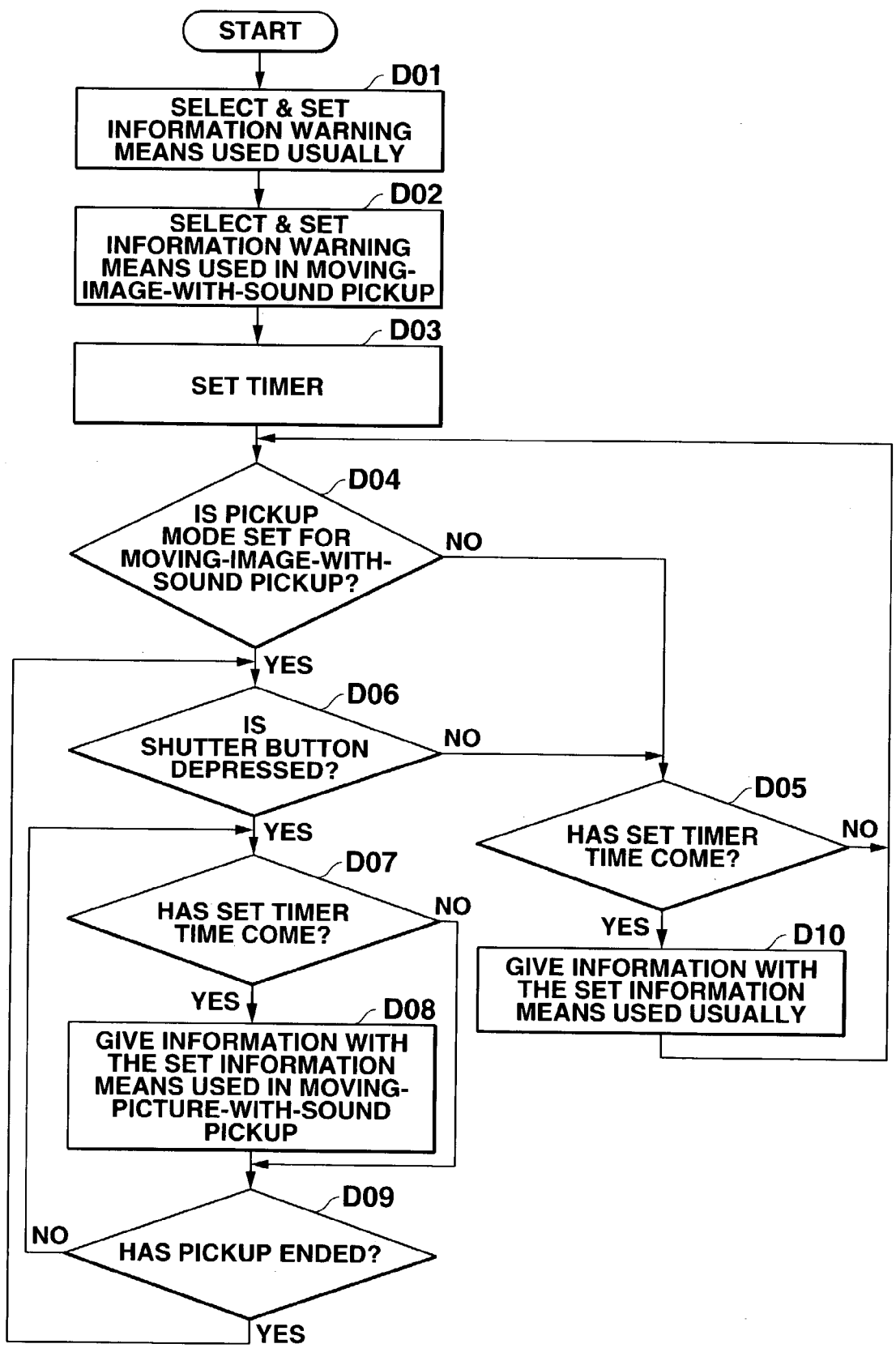
FIG. 6 is a flowchart indicative of an alarm information process based upon a timer function of a digital camera of a fifth embodiment.

FIG. 6 shows a series of processes for giving alarm information based upon the timer function in the pickup of the moving image with sound, especially distinguished from other cases.

First, any information means is selected and set that gives general alarm information used usually excluding in the moving-image-with-sound pickup (step D01), and also any information means is selected and set that gives alarm information in the moving-image-with-sound pickup (step D02).

When the time after or at which the alarm information is actually given is set by the timer 32 (step D03), the controller 22 then determines repeatedly whether the pickup mode is set for the pickup of the moving image with sound (step D04), and whether or not the time set at step C03 has run out or come (step D05) to thereby wait for such situation to come.

When the controller 22 determines at step D04 that the pickup mode is set for the moving-image-with-sound pickup, it then determines whether or not the shutter button of the key-in unit 27 has been depressed (step D06). If not, control passes to step D05. Then, the controller repeats steps D04, D06 and D05 while waiting for the start of the moving-image-with-sound pickup to be commanded by the depression of the shutter button or otherwise waits for the time set by the timer function to run out or come.

The image pickup starts when the controller 22 determines at step D06 that the shutter button has been depressed. Then, the controller 22 determines repeatedly whither or not the set time has run out or come (step D07) and whether or not termination of the pickup has been commanded by canceling the depression of the shutter button (step D09).

When the controller 22 determines at step D07 that the set time has run out or come, the alarm information is given by the information means in the moving-image-with-sound pickup set at step D02 (step D08). After this, control then returns to step D09.

When the controller 22 determines at step D09 that the termination of the moving image pickup is commanded by canceling the depression of the shutter button, control then returns to step D06 to thereby wait for the start of the moving-image-with-sound pickup to be commanded or for the time set by the timer function to run out or come.

When the controller 22 determines at step D05 that the set time has run out or come, the alarm information is given by the usually used information means set at step D02 (step D10), and control then returns to step D04.

As described above, the user of the digital camera 10 can set any information method on condition that the moving-image-with-sound pickup is not adversely affected to thereby customize the information method so as to meet the user's preference. Thus, the user can freely select information means having improved handiness that the user can easily understand.

While in the particular embodiment the warning means is settable arbitrarily that is capable of giving alarm information in the moving-image-with-sound pickup, distinguished from the alarm information given in other cases, the user may give desired alarm information with any information means that the user prefers in each pickup mode.

While in the first-fourth embodiments it is illustrated that the information control is provided when predetermined conditions that the time set by the timer has run out or come in the image pickup operation or mode are met, the above information control may be provided in a cellular phone with a camera function when predetermined conditions that there has been an incoming call in the image pickup operation or mode are met.

Sixth Embodiment

The sixth embodiment of the present invention directed to a cellular phone with a camera will be described next with reference to the drawings.

Figure 7:
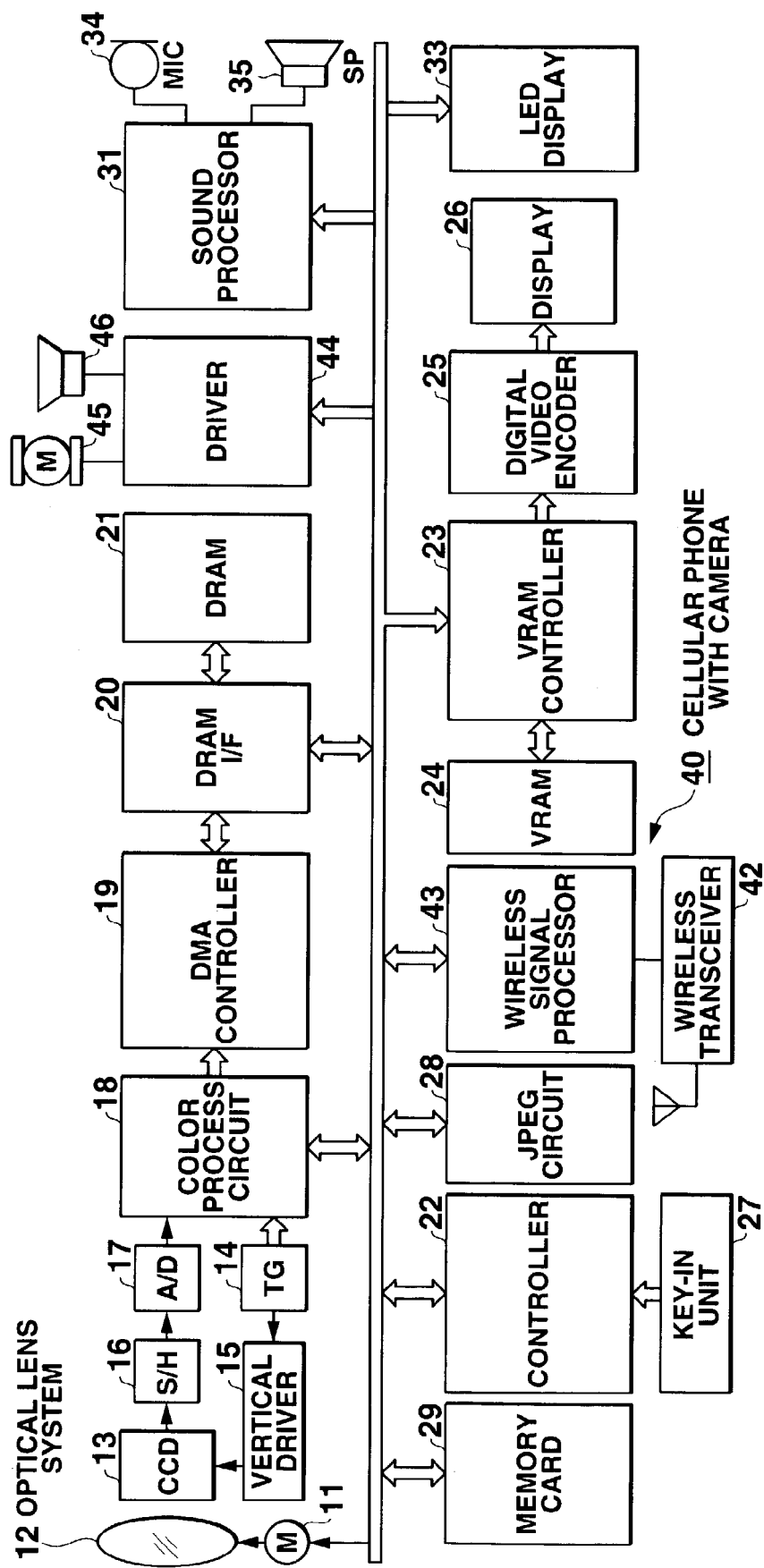
FIG. 7 is a flowchart indicative of an alarm information process based upon a timer function of a digital camera of a sixth embodiment.

FIG. 7 illustrates the circuit composition of the cellular phone with a camera 40. The whole circuit composition of the phone is basically the same as the camera of FIG. 1. Thus, a component of this embodiment identical to that of the embodiment of FIG. 1 is identified by the same reference numeral as used to denote that element of FIG. 1 and further FIGUREs and description thereof will be omitted.

A wireless transceiver 42 sends/receives data such as sound, image or character data via an antenna 41.

A wireless signal processor 43 demodulates the data received by the wireless transceiver 42 or modulates transmit data and outputs it to the wireless transceiver 42.

A driver 44 drives an incoming call warning vibrator 45 and a speaker 46.

A sound signal processor 31, a microphone 34 and a speaker 35 are used in the pickup/replay of a moving image with sound as well as when the cellular phone 40 sends/receives sound data to/from, and talks with, other cellular phones.

Figure 8:
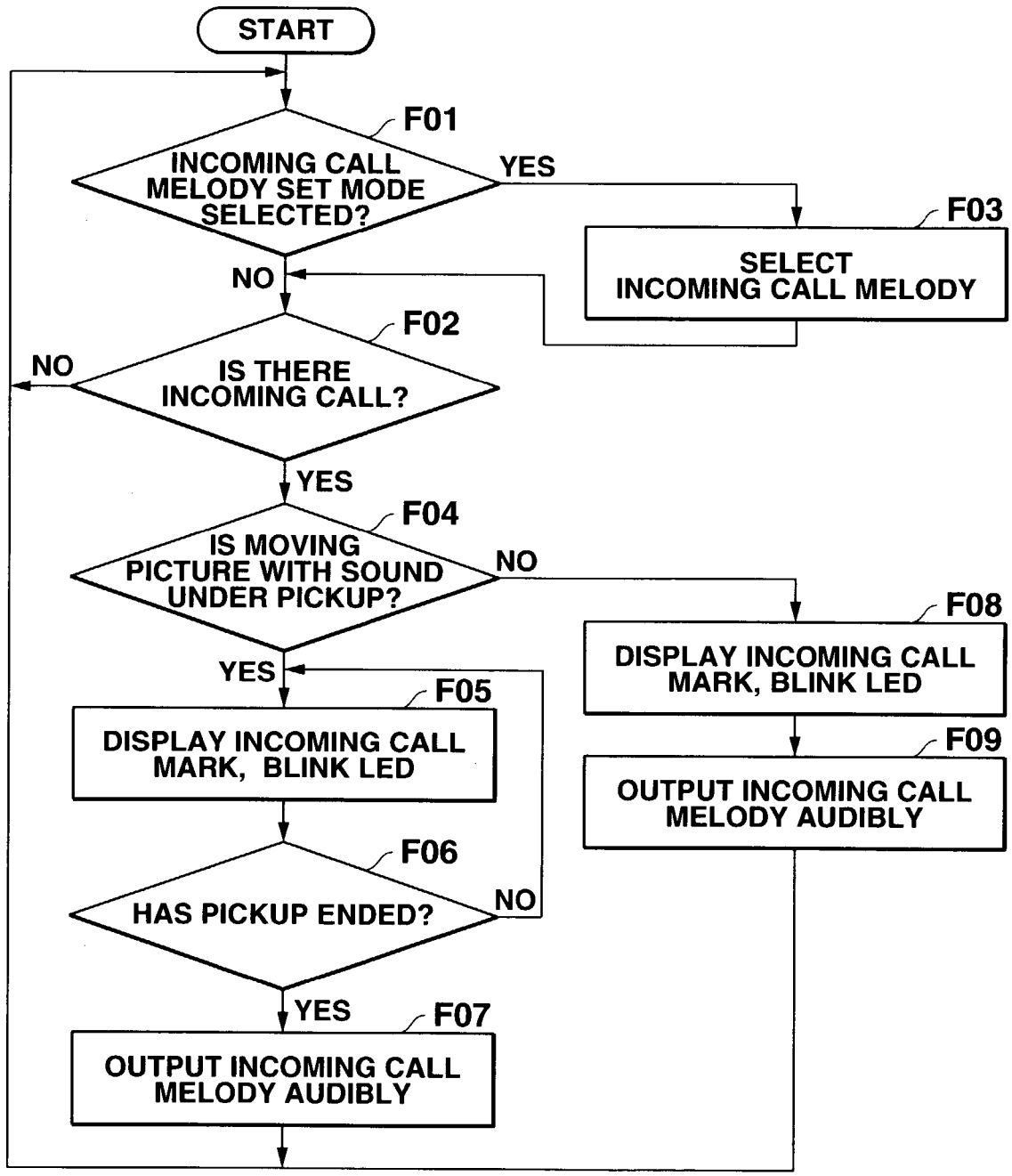
FIG. 8 is a flowchart indicative of an incoming call warning process according to the sixth embodiment.

FIG. 8 mainly illustrates an incoming call process performed by the controller 22 when a record mode is selected as a basic mode. First, the controller 22 repeatedly determines whether or not an incoming call process set mode is selected (step F01) and whether or not there is an incoming call (step F02) to thereby wait for such situation to come.

The controller 22 determines at step F02 that there is an incoming call when there is such call from another cellular phone or an electronic mail received from another terminal.

When the controller 22 determines at step F01 that the incoming call process set mode is selected, it then selects a title of a melody to be output audibly when there is an incoming call (step F03).

In this case, the controller 22 displays a list of titles of melodies prepared beforehand on the display 26, and urges the user of the cellular phone 40 to select a desired one from among the list of melodies by manipulating the cross and "set" keys of the key-in unit 27.

When the controller 22 determines at step F02 that there is an incoming call, it then determines whether or not the moving image with sound is under pickup at that time (step F04).

If so, the controller 22 displays an incoming call mark indicative of the arrival of an incoming call on the display 26. Simultaneously, the controller 22 causes any particular LED lamp of the LED indicator 33 to only blink for a predetermined time (step F05) while waiting for the moving-image-with-sound pickup to be terminated (step F06).

When the controller 22 determines at step F06 that the moving image pickup has been terminated, it stops giving information about arrival of the incoming call, using only indication at step F05, and causes the speaker 46 to amplify tone data on the melody selected at step F02 and produce it audibly as a melody tone to thereby inform the user of the arrival of the incoming call (step F07). Thus, the series of processes of this flowchart is then terminated, and control returns to step F01.

If the controller 22 determines at step F04 that no moving image with sound is under pickup when there is an incoming call, it then causes an incoming call mark indicative of arrival of the incoming call to be displayed on the display 26 while blinking any one of the LEDs of the LED indicator 33 for a predetermined time (step F08). Simultaneously, the controller causes the speaker 46 to replay, amplify and audibly produce as a melody tone the tone data on the melody selected at step F03 to thereby give alarm information (step F09). This terminates the series of process of this flowchart, and control then returns to step F01.

Also, when a vibrator is set so as to give information about arrival of an incoming call and when there is an incoming call during the moving-image-with-sound pickup, the controller 22 inhibits giving information about arrival of the incoming call based upon the vibrator 45. After the pickup is terminated, the controller 22 starts to give information about arrival of the incoming call based upon the vibrator 45.

While the first-fifth embodiments illustrate application of the present invention to the timer alarm function, and the sixth embodiment illustrates application of the present invention to the incoming-call information function, the present invention is not limited to these particular cases. For example, the present invention is also applicable to a voltage-drop alarm function that warns the user of consumption of the batteries.

While the first-fifth embodiments also illustrate application of the present invention to the digital still cameras and the sixth embodiment also illustrates application of the present invention to the cellular phone with a camera function, the present invention is not limited to these particular cases. For example, the present invention can be easily implemented in digital video (movie) cameras and PDAs with a camera function.

While the sound recording operation in the moving-image-with-sound pickup is performed directly before or after the still-image pickup, the pickup should include the still image pickup and the sound recording operation herein.

When the pickup (record) mode is set, this situation is referred to as "being under image pickup" herein.

The present invention is not limited to the above-mention embodiments. Various changes and modification would be possible to those skilled in the art without departing from the spirit and scope of the present invention defined by the attached claims.

What is claimed is:

1. An electronic camera comprising:
   an image pickup control unit for causing an image pickup unit to perform a predetermined image pickup operation;
   a shutter button operable for commanding recording of an image;
   a first determining unit for determining whether or not predetermined information conditions, exclude operation of the shutter button, are satisfied;
   a second determining unit for, at a time when the first determining unit determines that the predetermined information conditions, excluding operation of the shutter button, are satisfied, determining whether or not the image pickup control unit causes the image pickup unit to perform the predetermined image pickup operation;
   a first information control unit, responsive to the second determining unit determining that the image pickup control unit does not cause the image pickup unit to perform the predetermined image pickup operation, for immediately commanding a first information unit to automatically start its information operation; and
   a second information control unit, responsive to the predetermined image pickup operation being terminated after the second determining unit determines that the image pickup control unit causes the image pickup unit to perform the predetermined image pickup operation, for commanding the first information unit to start its information operation.

2. The electronic camera of claim 1, further comprising:
   a first detection unit for detecting that the predetermined image pickup operation has been terminated;
   wherein the second information control unit delays a command of the first information unit to start its information operation until the first detection unit detects that the predetermined image pickup operation is terminated.

3. The electronic camera of claim 2, wherein the second information control unit is responsive to the first detection unit detecting that the predetermined image pickup operation has been terminated to thereby command the first information unit to start its information operation.

4. The electronic camera of claim 1, wherein the first information unit comprises a speaker.

5. The electronic camera of claim 1, wherein the first information unit comprises a vibrator.

6. The electronic camera of claim 1, further comprising:
   a setting unit for setting any alarm time manually;
   wherein the first determining unit is responsive to the alarm time set by the setting unit coinciding with a present time to thereby determine that the predetermined information conditions are satisfied.

7. The electronic camera of claim 1, further comprising:
   a setting unit for setting any desired alarm time manually;
   wherein the first determining unit is responsive to the desired alarm time set by the setting unit having elapsed to thereby determine that the predetermined information conditions are satisfied.

8. The electronic camera of claim 1, further comprising:
   a second detection unit for detecting an incoming call, and the first determining unit is responsive to the second detection unit detecting the incoming call to thereby determine that the predetermined information conditions are satisfied.

9. The electronic camera of claim 1, further comprising a third information control unit, responsive to the second determining unit determining that the image pickup control unit causes the image pickup unit to perform its predetermined image pickup operation, for commanding a second information unit different from the first information unit to start its information operation.

10. The electronic camera of claim 9, wherein the second information unit comprises a display output unit.

11. The electronic camera of claim 1, wherein the third information control unit causes the second information unit to continue the information operation until the predetermined image pickup operation is terminated.

12. The electronic camera of claim 1, wherein the image pickup control unit causes the image pickup unit to perform a moving-image pickup operation.

13. The electronic camera of claim 1, wherein the image pickup control unit causes the image pickup unit to perform a moving-image pickup operation and also causes a recording unit to record sound involved in the moving-image.

14. The electronic camera of claim 1, wherein the image pickup control unit causes the image pickup unit to perform a still-image pickup operation.

15. The electronic camera of claim 1, further comprising:
a mode setting unit for setting an image pickup mode manually;
wherein the image pickup control unit causes the image pickup unit to perform a through-image pickup operation when the mode setting unit has set the image pickup mode; and
wherein the second information control unit is responsive to the first determining unit determining that the predetermined information conditions are satisfied while the image pickup control unit causes the image pickup unit to perform the through-image pickup operation to thereby delay a command of the first information unit to start its information operation until the mode setting unit cancels the set image pickup mode.

16. The electronic camera of claim 1, further comprising:
a mode setting unit for setting an image pickup mode manually;
wherein the image pickup control unit causes the image pickup unit to perform a through-image pickup operation when the mode setting unit has set the image pickup mode; and
the second information control unit is responsive to the first determining unit determining that the predetermined information conditions are satisfied while the image pickup control unit causes the image pickup unit to perform the through-image pickup operation to thereby delay a command of the first information unit to start its information operation until the mode setting unit cancels the set image pickup mode.

17. The electronic camera of claim 1, further comprising:
a first select unit for selecting any desired one from a plurality of information units; and
a third determining unit for determining whether or not the desired information unit selected by the first select unit is the first information one,
the second information control unit being responsive to the third determining unit determining that the desired information unit selected by the first select unit is the first information one to thereby delay a command of the first information unit to start its information operation until the predetermined image pickup operation is terminated.

18. The electronic camera of claim 1, further comprising:
a fourth determining unit for determining whether or not the image pickup control unit has caused the image pickup unit to perform its image pickup operation during the information operation of the first information unit started in accordance with the command of the first information control unit; and
a forth information control unit, responsive to the fourth determining unit determining that the image pickup control unit has caused the image pickup unit to perform its image pickup operation, for stopping the information operation of the first information unit started in accordance with the command of the first information control unit.

19. The electronic camera of claim 1, wherein:
the first information control unit commands the first information unit to start to replay a desired piece of music; and
the second information control unit delays a command of the first information unit to start to replay the desired piece of music until the predetermined image pickup operation is terminated.

20. The electronic camera of claim 1, further comprising:
a second select unit for manually selecting any desired one from a plurality of different pieces of music;
wherein the first information control unit commands the first information unit to start to replay the desired piece of music selected by the second select unit; and
the second information control unit delays a command of the first information unit to start to replay the desired piece of music selected by the second select unit until the predetermined image pickup operation is terminated.

21. A method of controlling information in an electronic camera, the method comprising the steps of:
determining whether or not predetermined information conditions, excluding operation of a shutter button are satisfied;
at a time when it is determined that the predetermined information conditions, excluding operation of the shutter button, are satisfied, determining whether a predetermined image pickup operation has been performed by an image unit;
responsive to determining that the predetermined image pick up operation has not been performed, commanding an information unit to automatically start its information operation; and
responsive to the image pickup operation being terminated after it is determined that the predetermined image pickup operation has been performed, commanding the information unit to start its information operation.

* * * * *